(12) United States Patent
Shi et al.

(10) Patent No.: US 9,720,454 B2
(45) Date of Patent: Aug. 1, 2017

(54) ELECTRONIC DEVICE AND CONNECTING DEVICE THEREOF

(71) Applicant: Lenovo (Beijing) Co., Ltd., Beijing (CN)

(72) Inventors: Wenbo Shi, Beijing (CN); Ping Tian, Beijing (CN); Zhifeng Xin, Beijing (CN); Xiaosong Xia, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 46 days.

(21) Appl. No.: 14/838,955

(22) Filed: Aug. 28, 2015

(65) Prior Publication Data
US 2016/0363964 A1    Dec. 15, 2016

(30) Foreign Application Priority Data

Jun. 11, 2015 (CN) .......................... 2015 1 0319437
Jul. 21, 2015 (CN) .......................... 2015 1 0432353

(51) Int. Cl.
*G06F 1/16* (2006.01)
*E05D 3/12* (2006.01)
*E05D 1/02* (2006.01)
*E05D 3/14* (2006.01)

(52) U.S. Cl.
CPC ............ *G06F 1/1681* (2013.01); *E05D 1/02* (2013.01); *E05D 3/122* (2013.01); *E05D 3/14* (2013.01); *G06F 1/1618* (2013.01); *E05Y 2900/606* (2013.01)

(58) Field of Classification Search
CPC ................................. G06F 1/1681; E05D 3/06
See application file for complete search history.

(56) References Cited

U.S. PATENT DOCUMENTS

| 4,823,858 A * | 4/1989 | Perutz .................. E04B 2/7405 16/366 |
| 2002/0023314 A1* | 2/2002 | Goldsmith .............. E05D 3/186 16/372 |
| 2011/0157780 A1* | 6/2011 | Wang ................... G06F 1/1681 361/679.01 |
| 2013/0214577 A1* | 8/2013 | Mojtabavi ................ A47B 3/08 297/331 |
| 2014/0196254 A1* | 7/2014 | Song ........................ E05D 3/14 16/302 |
| 2014/0245569 A1 | 9/2014 | Cho et al. |
| 2015/0047446 A1* | 2/2015 | Lai ........................... E05D 3/12 74/96 |
| 2015/0176317 A1* | 6/2015 | Lee .......................... E05D 3/06 16/251 |

(Continued)

OTHER PUBLICATIONS

First German Office Action regarding Application No. 10 2015 218 404.8 dated Oct. 14, 2015. English translation provided by Unitalen Attorneys at Law.

*Primary Examiner* — Adrian S Wilson
(74) *Attorney, Agent, or Firm* — Harness, Dickey & Pierce, P.L.C.

(57) ABSTRACT

It is provided according to embodiments of the application a connecting device and an electronic device including the connecting device. The connecting device includes a first mounting plate, a second mounting plate, a hinge assembly and a filler. The hinge assembly rotatably connects the first mounting plate and the second mounting plate, and the filler fills a gap inside the hinge assembly.

18 Claims, 7 Drawing Sheets

(56) References Cited

U.S. PATENT DOCUMENTS

| | | | |
|---|---|---|---|
| 2015/0361696 A1* | 12/2015 | Tazbaz | H04M 1/022 361/679.27 |
| 2016/0083987 A1* | 3/2016 | Xia | E05D 7/00 16/223 |
| 2016/0224072 A1* | 8/2016 | Huang | E05D 7/06 |
| 2016/0342180 A1* | 11/2016 | Xin | G06F 1/1616 |

* cited by examiner

ELECTRONIC DEVICE AND CONNECTING DEVICE THEREOF

The present application claims the priority to Chinese Patent disclosure No. 201510319437.6, entitled as "ELECTRONIC DEVICE AND CONNECTING DEVICE THEREOF", filed on Jun. 11, 2015 with State Intellectual Property Office of People's Republic of China, which is incorporated herein by reference in its entirety.

The present application claims the priority to Chinese Patent disclosure No. 201510432353.3, entitled as "ELECTRONIC DEVICE AND ENVELOPING PART THEREOF", filed on Jul. 21, 2015 with State Intellectual Property Office of People's Republic of China, which is incorporated herein by reference in its entirety.

FIELD

This application relates to the field of electronic device manufacture, and in particular to an electronic device and a connecting device thereof.

BACKGROUND

With the development of electronic technology, folding or unfolding mode of an electronic device has been developed from a traditional mode of folding or unfolding within 180° to a mode of folding or unfolding at any angle within 360°, which improves the convenience of the laptop for various applications, thereby improving a user experience.

Currently, a laptop generally includes structurally a first body, a second body and a connecting device for connecting the first body and the second body.

SUMMARY

A connecting device and an electronic device including the connecting device are provided according to embodiments of the present application, to solve the problem that a gap is existed between adjacent multispindle hinges such that user requirements on the appearance of the electronic device is hard to meet, and improve the user experience.

In one aspect, a connecting device configured to connect a first body of an electronic device and a second body of the electronic device is provided. The connecting device includes a first mounting plate, a second mounting plate, a hinge assembly and a filler, the hinge assembly rotatably connects the first mounting plate and the second mounting plate, and the filler fills a gap inside the hinge assembly.

In another aspect, an electronic device is provided. The electronic device includes a first body, a second body and a connecting device configured to connect the first body and the second body, the connecting device includes a first mounting plate, a second mounting plate, a hinge assembly and a filler, the hinge assembly rotatably connects the first mounting plate and the second mounting plate, and the filler fills a gap inside the hinge assembly.

In the technical solution according to the embodiments of the present application, the connecting device includes a first mounting plate, a second mounting plate, a hinge assembly and a filler. The hinge assembly rotatably connects the first mounting plate and the second mounting plate, and the filler fills a gap inside the hinge assembly, thereby solving the problem that a gap exists between adjacent multispindle hinges such that user requirements on the appearance of the electronic device is hard to meet, and improving the user experience.

BRIEF DESCRIPTION OF THE DRAWINGS

To illustrate the technical solutions of the embodiments of the present application more clearly, the drawings used in describing the embodiments of the application are briefly described below. Apparently, the drawings referred in the following description constitute only some embodiments of the application. Those skilled in the art may obtain some other drawings from these drawings without any creative work.

DETAILED DESCRIPTION

For ensuring the stability of the first body and the second body being connected by the connecting device, the first mounting plate and the second mounting plate are generally provided with multiple independent multispindle hinges. There is a gap between adjacent multispindle hinges, which is hard to meet user requirements on the appearance of an electronic device, and reduces the user experience.

In view of this, an embodiment of the present application provides a connecting device configured to connect a first body of an electronic device and a second body of the electronic device. The connecting device includes a first mounting plate, a second mounting plate, a hinge assembly and a filler. The hinge assembly rotatably connects the first mounting plate and the second mounting plate, and the filler fills a gap inside the hinge assembly.

Correspondingly, an embodiment of the present application further provides an electronic device which includes a first body, a second body and a connecting device configured to connect the first body and the second body. The connecting device is the connecting device described above.

The connecting device and the electronic device including the connecting device according to the embodiments of the present application include the filler in addition to the first mounting plate, the second mounting plate and the hinge assembly, the filler is configured to fill the gap inside the hinge assembly, thereby solving the problem in the related connecting device that a gap is existed between adjacent multispindle hinges such that user requirements on the appearance of the electronic device is hard to meet, and improving the user experience.

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of the present application.

Although many specific details are explained in the following description so as to fully understand the present application, the present application may also be implemented by other ways other than those described herein, which may be modified by the person skilled in the art without departing from the content of the present application. Therefore, the present application is not limited by the specific embodiments disclosed below.

Figure 1:
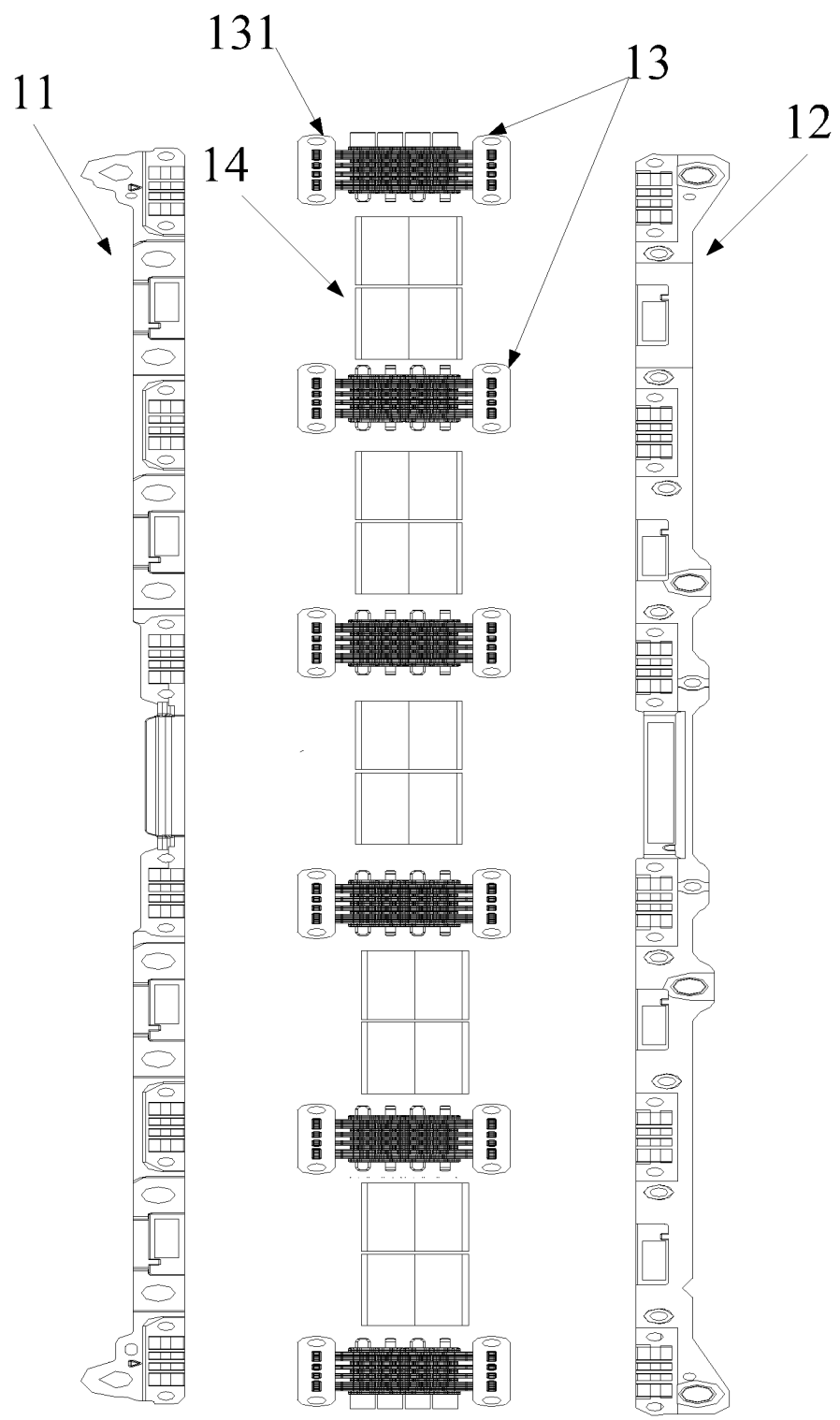
FIG. 1 is a schematic diagram showing the structure of a connecting device according to an embodiment of the present application.

An embodiment of the present application provides a connecting device configured to connect a first body and a second body of an electronic device. As shown in FIG. 1, the connecting device includes a first mounting plate 11, a second mounting plate 12, a hinge assembly 13 and a filler 14. The hinge assembly 13 rotatably connects the first mounting plate 11 and the second mounting plate 12, and the filler 14 fills a gap inside the hinge assembly 13.

Based on the above embodiments, in another embodiment of the present application, the hinge assembly 13 includes at least two multispindle hinges 131, and the filler 14 fills the gap between the at least two multispindle hinges 131. In other embodiments of the present application, the hinge assembly 13 may include any number of multispindle hinges 131. The present application does not limit to the above, which can be arranged as appropriate.

Figure 2:
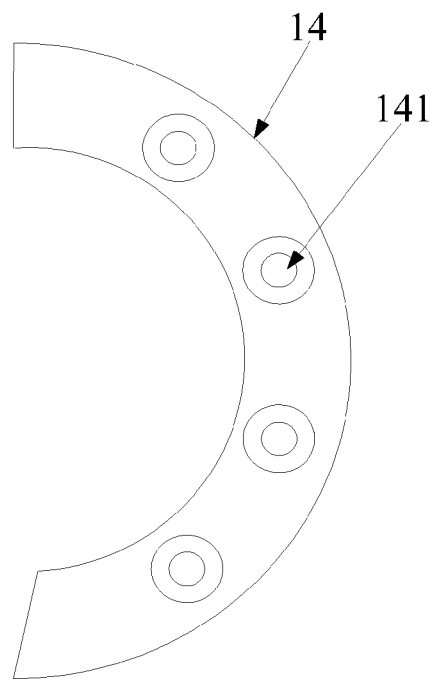
FIG. 2 is a side view diagram of a filler in the connecting device according to the embodiment of the present application.
Figure 3:
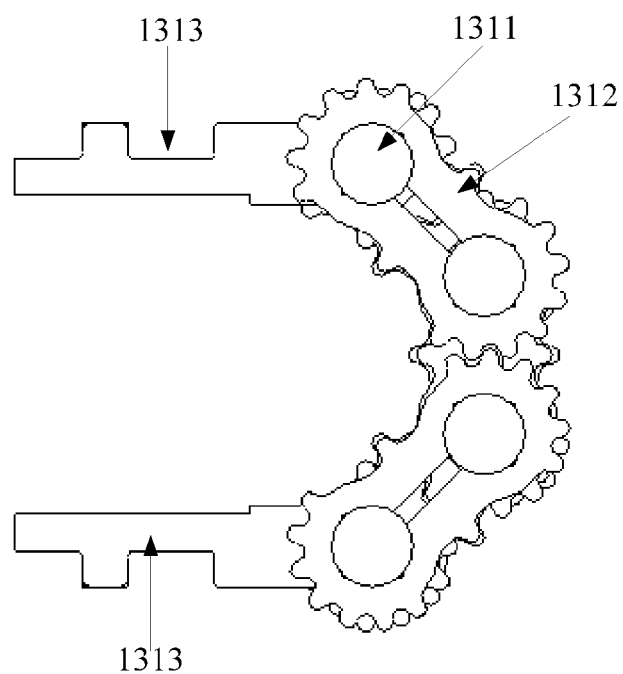
FIG. 3 is a side view diagram of multispindle hinges in the connecting device according to the embodiment of the present application.

Based on any one of the above embodiments, in an embodiment of the present application, as shown in FIG. 2, the filler 14 is an arc-shaped structure, and an arc-shaped side wall of the arc-shaped structure is provided with at least one through hole 141 passing though the arc-shaped side wall along an extending direction of the arc-shaped side wall. In one embodiment, as shown in FIG. 3, the multispindle hinge 131 includes: multiple spindles 1311 parallel to each other, and adjacent spindles 1311 are connected to each other by a connector 1312, and a spindle located at the edge of the multispindle hinges 131 is provided with a connecting rod 1313. The connecting rods at a first side of the multispindle hinges 131 are fixedly connected to the first mounting plate 11, and the connecting rods at a second side of the multispindle hinges 131 are fixedly connected to the second mounting plate 12, to make the first mounting plate 11 and the second mounting plate 12 fixedly connected by the multispindle hinges 131. In specific mounting, in this embodiment, the parallel spindles 1311 of the multispindle hinges 131 pass through the through holes 141 in the fillers 14, and connect the fillers 14 together.

It is to be noted that, based on the above embodiment, in another embodiment of the present application, the number of the spindles 1311 in the multispindle hinges 131 is the same as the number of the through holes 141 in the filler 14. However, the present application does not limit to this. In other embodiments of the present application, the number of the spindles 1311 in the multispindle hinges 131 may also be smaller than the number of the through holes 141 in the filler 14, as long as the number of the spindles 1311 in the multispindle hinges 131 is not greater than the number of the through holes 141 in the filler 14.

Based on any one of the above embodiments, in another embodiment of the present application, the connecting device further includes: a first enveloping part. The first enveloping part envelops at least partial areas of the hinge assembly 13 and the filler 14. That is, in one embodiment of the present application, the first enveloping part may completely envelop the hinge assembly 13 and the filler 14, and in another embodiment of the present application, the first enveloping part may also only envelop partial areas of the hinge assembly 13 and the filler. The present application does not limit to the above, which can be arranged as appropriate.

Based on any one of the above embodiments, in another embodiment of the present application, the connecting device further includes: a second enveloping part (not shown). The second enveloping part is located between adjacent fillers 14, for enveloping the connector 1312, to allow the surface of the connecting device to be more smooth, and the appearance to be more aesthetic. However, the present application does not limit to the above, which can be arranged as appropriate.

Based on the above embodiment, in another embodiment of the present application, a surface of the second enveloping part at a side away from the connector 1312 is an arc-shaped surface, and is flush with an outer surface of the arc-shaped side wall of the filler 14 in the extending direction of the arc-shaped side wall of the filler 14, to allow the outer surface of the arc-shaped side wall of the filler 14 and the surface of the second enveloping part at the side away from the connector 1312 to be in the same curved plane, to ensure that the outer surface of the connecting device to be smooth.

Based on the above embodiment, in another embodiment of the present application, the material of the second enveloping part is a flexible material, to increase the flexibility of the second enveloping part, to allow the second enveloping part to envelop the connector 1312 more completely, to reduce the gap between adjacent fillers 14 as much as possible.

Figure 4:
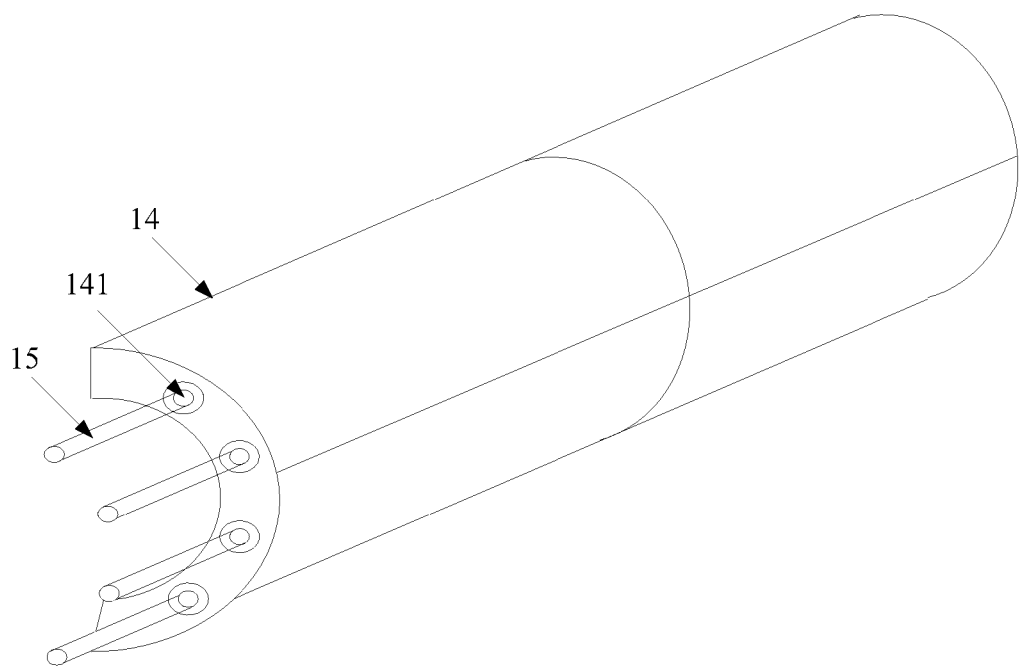
FIG. 4 is a schematic structural diagram showing the relative position between the filler and a metal tube in the connecting device according to the embodiment of the present application.

Based on any one of the above embodiments, in another embodiment of the present application, as shown in FIG. 4, the connecting device further includes: a metal tube 15 located in the through hole 141. The metal tube 15 passes through the through hole 141. The metal tube 15 is sleeved on the spindle 1311 of the multispindle hinge 131, and the diameter of the metal tube 15 is greater than the diameter of the spindle 1311 of the multispindle hinge 1311, to allow the spindle 1311 of the multispindle hinge 131 to rotate in the metal tube 15, to achieve a rotatable connection between the first mounting plate 11 and the second mounting plate 12.

Based on any one of the above embodiments, in another embodiment of the present application, the material of the filler 14 is also a flexible material, to increase the flexibility of the filler 14, which may not only allow the filler 14 to fill the gap between adjacent multispindle hinges 131 more completely, but also improve the touch felling of the filler 14.

Based on any one of the above embodiments, in another embodiment of the present application, the flexible material may be rubber, and in other embodiments of the present application, the flexible material may also be leather or PU etc., which is not limited in the present application, as long as it is a material having certain flexibility.

Figure 5:
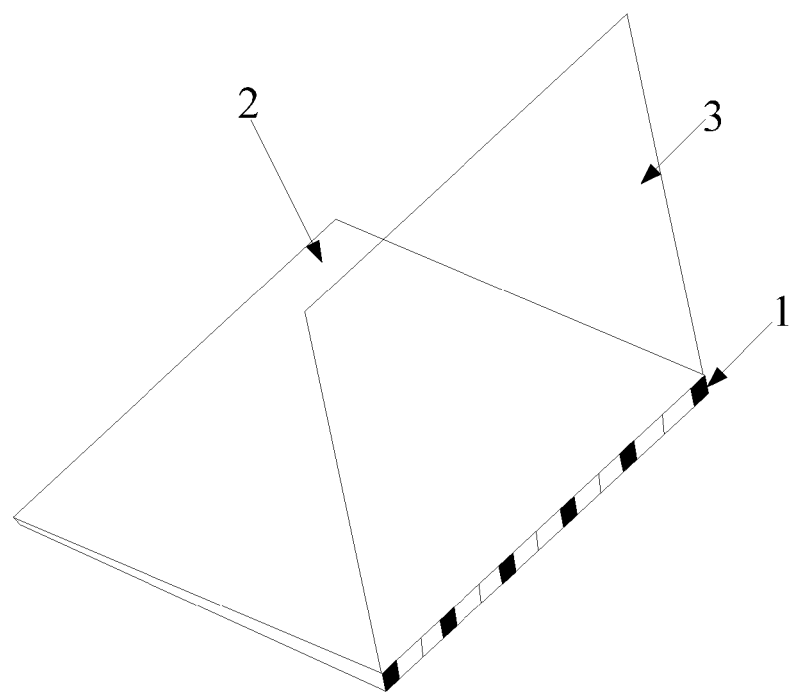
FIG. 5 is a schematic diagram showing the structure of an electronic device according to an embodiment of the present application.

Correspondingly, an electronic device is further provided according to the present application. As shown in FIG. 5, the electronic device includes: a first body 2, a second body 3, and a connecting device 1 configured to connect the first body 2 and the second body 3. The connecting device 1 is the connecting device according to any one of the above embodiments. The connecting device 1 includes: a first mounting plate, a second mounting plate, a hinge assembly and a filler. The hinge assembly rotatably connects the first mounting plate and the second mounting plate, and the filler fills a gap inside the hinge assembly.

Figure 6:
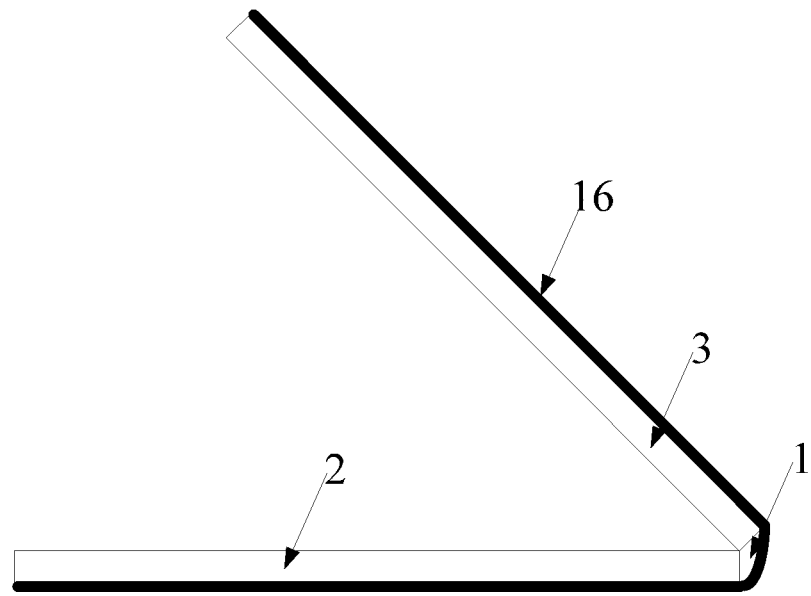
FIG. 6 is a schematic diagram showing the structure of an electronic device according to another embodiment of the present application.

It is to be noted that, in an embodiment of the present application, as shown in FIG. 6, in the case that the connecting device 1 includes a first enveloping part 16, and the first enveloping part 16 may also extend to a side of the connecting device 1 facing towards the first body 2 and the second body 3, which not only envelops at least partial areas of the hinge assembly and the filler, but also at least a partial area of the first body 2 and/or at least a partial area of the second body 3. The present application does not limit to the above, which can be arranged as appropriate.

Based on the above embodiment, in another embodiment of the present application, the filler in the connecting device 1 is fixedly connected to the first body 2 by ultrasound welding. In similar principle, the filler in the connecting device 1 is fixedly connected to the second body 3 also by ultrasound welding. The present application does not limit to this. In other embodiments of the present application, the filler in the connecting device 1 may also be fixed to the first body 2 and/or the second body 3 by other fixing means, which can be chosen as appropriate.

In summary, the connecting device and the electronic device including the connecting device according to the embodiments of the present application include the filler in addition to the first mounting plate, the second mounting plate and the hinge assembly, the filler is configured to fill the gap inside the hinge assembly, thereby solving the problem in the related connecting device that a gap exists between adjacent multispindle hinges such that user requirements on the appearance of the electronic device is hard to meet, and improving the user experience.

Figure 7:
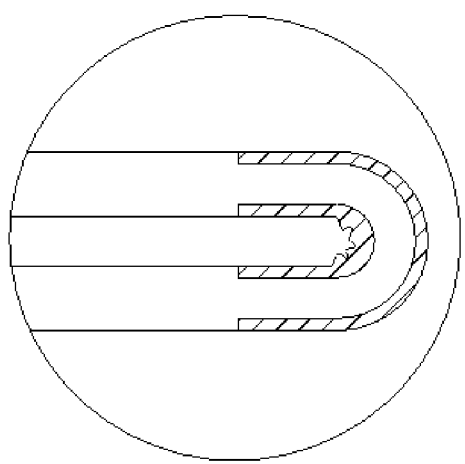
FIG. 7 shows a schematic view of creases or folds phenomenon in a related electronic device.

An electronic device generally includes a body, a rotating spindle, and a supporter, etc. During rolling of the rotating spindle, the rotating spindle surface or the supporter surface tends to appear creases or folds, as shown in FIG. 7. In addition, the enveloping part near the rotating spindle may have problems such as being unevenly stretched due to folding or unfolding of the electronic device. Such creases or folds or uneven stretch may not only impact the appearance effect of the whole electronic device, but also cause lots of disadvantageous effects to the service life of the material of the enveloping part and the operation of the nearby components of the enveloping part.

Figure 8:
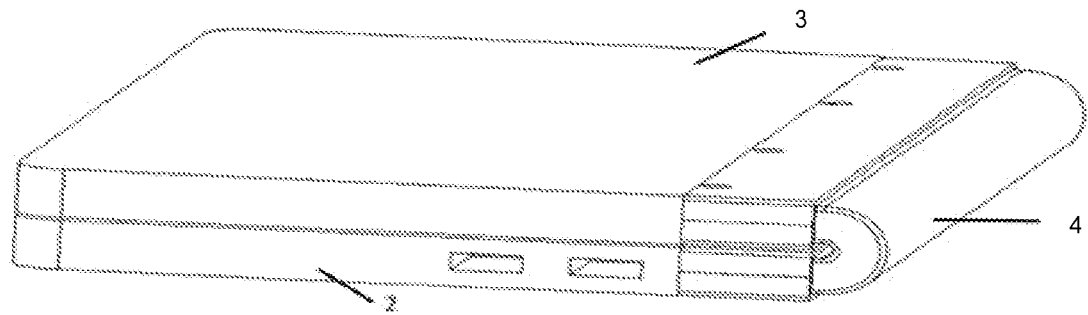
FIG. 8 shows a schematic diagram of a enveloping mechanism and an electronic device according to present application.

A first enveloping part (or a enveloping mechanism) according to an embodiment of the present application and an electronic device having the enveloping part are as shown in FIG. 8. The electronic device includes a first body 2 and a second body 3, a connecting device and a enveloping mechanism 4 (i.e., the first enveloping part). In an embodiment of the present application, the connecting device may include a rotating mechanism. The first body 2 and the second body 3 are pivotally connected via the rotating mechanism. The enveloping mechanism 4 is fixed at its two sides respectively to the first body and the second body, to envelop and shield at least a portion of the rotating mechanism, so as to envelop therein, for example, a rotating element.

The enveloping mechanism 4 includes at least one bendable and stretchable device 410. Each bendable and stretchable device 410 includes a first connecting body 411 with a first tightness and a second connecting body 412 with a second tightness. The first connecting body 411 and the second connecting body 412 are connected to each other, and in the case that the rotating mechanism rotates by various angles, the first connecting body and the second connecting body cooperatively bend without appearing a crease or a fold.

Figure 9:
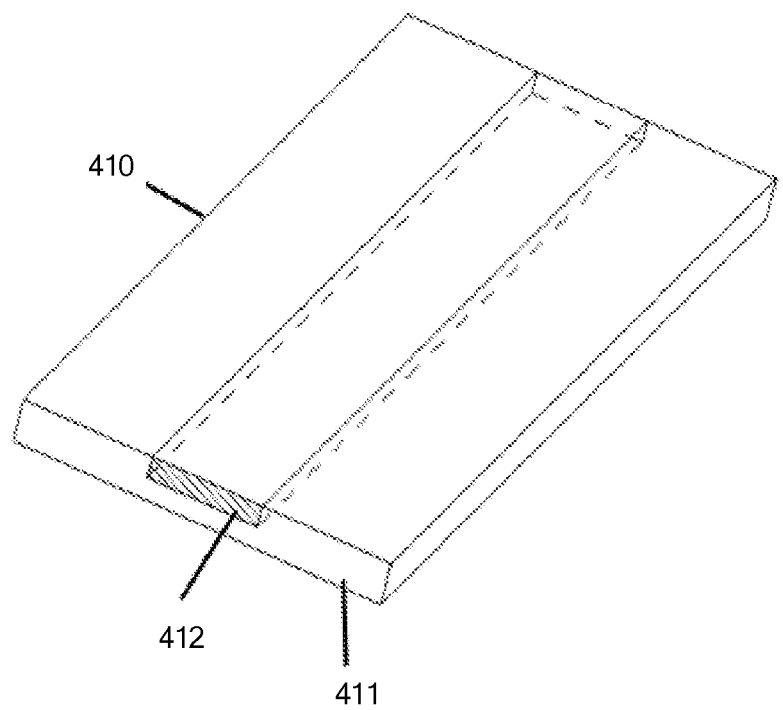
FIG. 9 shows a schematic diagram of the structure of a bendable and stretchable device according to the present application.

An example of a specific structure of the bendable and stretchable device 410 is illustrated hereinafter with reference to FIGS. 9 and 10. The example is only an embodiment, and is not intended to limit the application. The first connecting body 411 functions as a main body of the bendable and stretchable device 410. The first connecting body 411 and the second connecting body 412 are connected in series with each other. The first connecting body 411 and the second connecting body 412 are at least partially overlapped. For example, the second connecting body 412 is embedded at a center portion of a surface on a side in the thickness direction of the first connecting body 411 along the length direction of the whole bendable and stretchable device 410, and is integrated to the first connecting body 411. Thus, one part of section B and two parts of section A are formed in the bendable and stretchable device 410.

The first tightness of the first connecting body 411 is smaller than the second tightness of the second connecting body 412, and the first connecting body 411 is easier to be stretched than the second connecting body 412. The second connecting body 412 is made of a non-stretchable material. The material of the second connecting body 412 may adopt but not be limited to an elastic steel strip, Mylar, etc.

Figure 10:
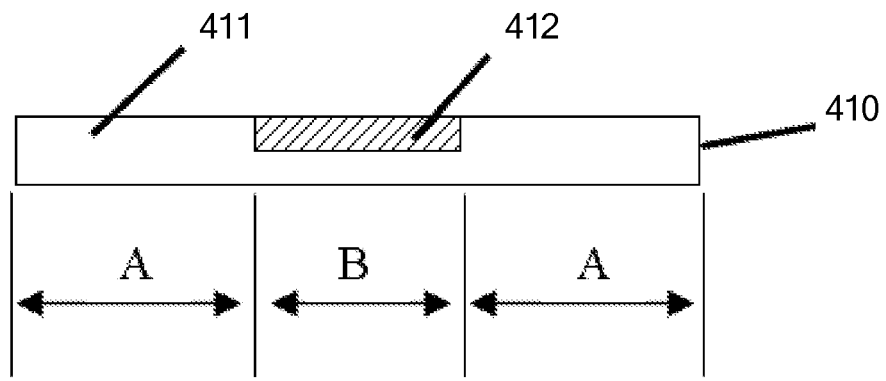
FIG. 10 shows a schematic diagram of various materials of the bendable and stretchable device according to the present application.

As shown in FIG. 10, in the case that the bendable and stretchable device 410 is integrated in the electronic device and rotates by various angles with the rotating mechanism of the electronic device, a portion of the bendable and stretchable device 410 may be stretched, such as the two parts of section A in FIG. 10 are stretched, and the part of section B is not stretched.

Optionally, the bendable and stretchable device further includes a third connecting body with a third tightness, the third connecting body and the first connecting body 411 are respectively connected in series to two sides of the second connecting body 412. The third tightness is smaller than the second tightness.

The application of the bendable and stretchable device 410 in the electronic device is specifically illustrated with reference to FIGS. 11 and 12.

Figure 11:
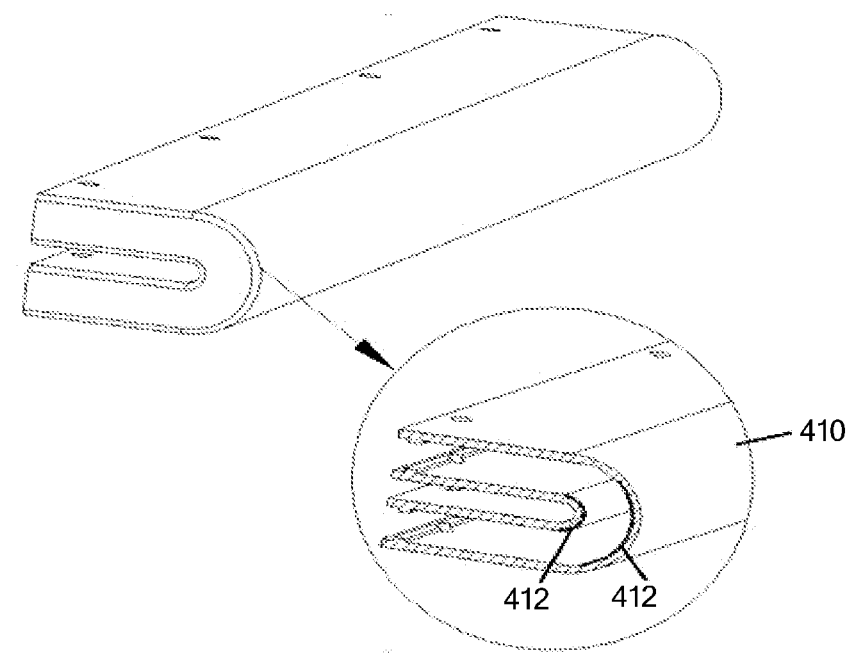
FIG. 11 shows a schematic diagram of a first embodiment in which the bendable and stretchable device according to the present application is applied in the electronic device.

FIG. 11 shows an embodiment in which the bendable and stretchable device 410 is applied in the electronic device. The bendable and stretchable device 410 is connected to the electronic device to allow the second connecting body 412 to face towards the rotating mechanism inside the enveloping mechanism 4. When the bendable and stretchable device 410 is located at a position at an inner side of the rotating mechanism, the part of section B of the bendable and stretchable device 410 keeps appearing no creases or folds due to being made of a non-stretchable material, and the parts of section A of the bendable and stretchable device 410 at two sides are not stretched. When the bendable and stretchable device 410 is located at a position at an outer side of the rotating mechanism, the part of section B of the bendable and stretchable device 410 is bent but not stretched, and the parts of section A at two sides of the bendable and stretchable device 410 are partially stretched, to provide extension required for functioning as the enveloping mechanism 4 due to being bent.

Figure 12:
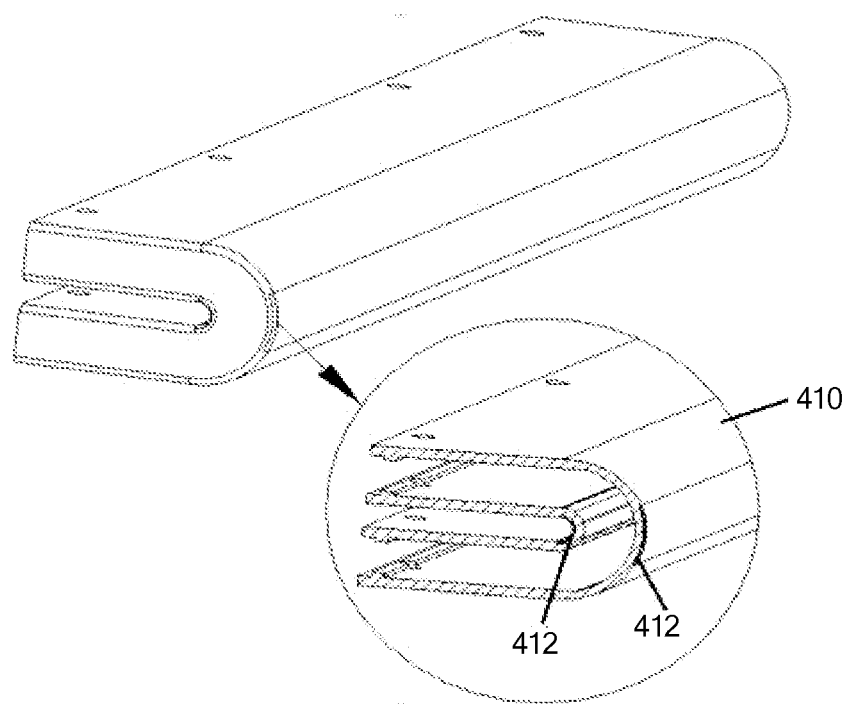
FIG. 12 shows a schematic diagram of a second embodiment in which the bendable and stretchable device according to the present application is applied in the electronic device.

FIG. 12 shows another embodiment in which the bendable and stretchable device 410 is applied in the electronic device. This embodiment is different from the embodiment illustrated in FIG. 11 in that, the bendable and stretchable device 410 is connected to the electronic device to allow the second connecting body 412 to face towards an outer side of the enveloping mechanism 4. Similar to the embodiment illustrated in FIG. 11, when the bendable and stretchable device 410 is located in a position at an inner side of the rotating mechanism, the part of section B of the bendable and stretchable device 410 keeps appearing no creases or folds due to being made of a non-stretchable material, and the parts of section A of the bendable and stretchable device 410 at two sides are not stretched. When the bendable and stretchable device 410 is located at a position at an outer side of the rotating mechanism, the part of section B of the bendable and stretchable device 410 is bent but not stretched, and the parts of section A at two sides of the bendable and stretchable device 410 are partially stretched, to provide extension required for functioning as the enveloping mechanism 4 due to being bent.

The above sections are described in a progressive manner. Each of the sections is mainly focused on describing its differences from other sections, and references may be made among these sections with respect to the same or similar portions among these embodiments.

Based on the above description of the disclosed embodiments, the person skilled in the art is capable of carrying out or using the present application. It is obvious for the person skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

APPENDIX 1

1. A connecting device, configured to connect a first body and a second body of an electronic device, the connecting device comprising:
   a first mounting plate;
   a second mounting plate;
   a hinge assembly rotatably connecting the first mounting plate and the second mounting plate; and
   a filler filling a gap inside the hinge assembly.

2. The connecting device according to claim 1, further comprising a first enveloping part enveloping at least partial areas of the hinge assembly and the filler.

3. The connecting device according to claim 1, wherein the hinge assembly comprises at least two multispindle hinges, and the filler fills a gap between the at least two multispindle hinges.

4. The connecting device according to claim 3, wherein the filler is an arc-shaped structure, and an arc-shaped side wall of the arc-shaped structure is provided with at least one through hole passing through the arc-shaped side wall along an extending direction of the arc-shaped side wall.

5. The connecting device according to claim 4, wherein the multispindle hinge comprises a plurality of spindles parallel to each other, adjacent spindles are connected to each other via a connector, and a spindle located at the edge of the multispindle hinges is provided with a connecting rod, wherein the connecting rods at a first side of the multispindle hinges are fixedly connected to the first mounting plate, and the connecting rods at a second side of the multispindle hinges are fixedly connected to the second mounting plate, and the number of the spindles in the multispindle hinges is the same as the number of the through holes in the filler.

6. The connecting device according to claim 5, further comprising a second enveloping part located between adjacent fillers and enveloping part the connector.

7. The connecting device according to claim 6, wherein a surface of the second enveloping part at a side away from the connector is an arc-shaped surface, and is flush with an outer surface of the arc-shaped side wall of the filler in the extending direction of the arc-shaped side wall of the filler.

8. The connecting device according to claim 7, wherein the material of the second enveloping part is a flexible material.

9. The connecting device according to any one of claims 5 to 8, further comprising a metal tube located in the through hole to pass through the through hole, wherein the metal tube is sleeved on the spindle of the multispindle hinge, and the diameter of the metal tube is greater than the diameter of the spindle of the multispindle hinge.

10. The connecting device according to claim 1, wherein the material of the filler is a flexible material.

11. The connecting device according to claim 8 or 10, wherein the flexible material is rubber.

12. An electronic device, comprising:
    a first body;
    a second body; and
    a connecting device configured to connect the first body and the second body, wherein the connecting device is the connecting device according to any one of claims 1 to 11.

13. The electronic device according to claim 12, wherein the filler in the connecting device is fixedly connected to the first body or the second body by ultrasound welding.

APPENDIX 2

1. A enveloping mechanism, fixed to a body of an electronic device, and comprising at least one bendable and stretchable device, wherein the bendable and stretchable device comprises:
   a first connecting body with a first tightness;
   a second connecting body with a second tightness;
   the first connecting body and the second connecting body are connected to each other, and in the case that the rotating mechanism rotates by various angles, the first connecting body and the second connecting body cooperatively without appearing a crease or a fold.

2. The enveloping mechanism according to claim 1, wherein the first tightness is smaller than the second tightness, and the first connecting body is easier to be stretched than the second connecting body.

3. The enveloping mechanism according to claim 2, wherein the second connecting body is made of a non-stretchable material.

4. The enveloping mechanism according to claim 1, wherein the first connecting body and the second connecting body are connected to each other in series.

5. The enveloping mechanism according to claim 1, wherein the first connecting body and the second connecting body are at least partially overlapped.

6. The enveloping mechanism according to claim 4, wherein the bendable and stretchable device further comprises a third connecting body with a third tightness, and the third connecting body and the first connecting body are respectively connected to two sides of the second connecting body in series.

7. The enveloping mechanism according to claim 6, wherein the third tightness is smaller than the second tightness.

8. An electronic device, comprising:
a first body;
a second body;
a rotating mechanism pivotally connected the first body and the second body; and
a enveloping mechanism enveloping and shielding at least a portion of the rotating mechanism, and the enveloping mechanism comprising at least one bendable and stretchable device, each bendable and stretchable device comprising: a first connecting body with a first tightness, and a second connecting body with a second tightness, the first connecting body and the second connecting body connected to each other, wherein in the case that the rotating mechanism rotates by various angles, the first connecting body and the second connecting body cooperatively bend without appearing a crease or a fold.

9. The electronic device according to claim 8, wherein the first tightness is smaller than the second tightness, and the first connecting body is easier to be stretched than the second connecting body.

10. The electronic device according to claim 9, wherein the second connecting body is made of a non-stretchable material.

11. The electronic device according to claim 8, wherein the enveloping mechanism are respectively fixed to the first body and the second body.

12. The electronic device according to claim 8, wherein the first connecting body and the second connecting body are connected to each other in series.

13. The electronic device according to claim 12, wherein the bendable and stretchable device further comprises a third connecting body with a third tightness, and the third connecting body and the first connecting body are connected in series respectively to two sides of the second connecting body.

14. The electronic device according to claim 13, wherein the third tightness is smaller than the second tightness.

15. The electronic device according to claim 8, wherein the first connecting body and the second connecting body are at least partially overlapped.

What is claimed is:

1. An enveloping mechanism fixed to a body of an electronic device and enveloping at least a portion of a connecting device, the enveloping mechanism comprises at least one bendable and stretchable device, the bendable and stretchable device comprises:
a first connecting body with a first tightness;
a second connecting body with a second tightness;
the first connecting body and the second connecting body are connected to each other, and in a case that the connecting device rotates by various angles, the first connecting body and the second connecting body cooperatively bend without appearing a crease or a fold.

2. The enveloping mechanism according to claim 1, wherein the first tightness is smaller than the second tightness, and the first connecting body is easier to be stretched than the second connecting body.

3. The enveloping mechanism according to claim 2, wherein the second connecting body is made of a non-stretchable material.

4. The enveloping mechanism according to claim 1, wherein the first connecting body and the second connecting body are connected to each other in series.

5. An electronic device comprising:
a first body;
a second body;
a connecting device configured to connect the first body and the second body; and
a first enveloping mechanism enveloping and shielding at least a portion of the connecting device, and the first enveloping mechanism comprising at least one bendable and stretchable device, each bendable and stretchable device comprises a first connecting body with a first tightness and a second connecting body with a second tightness, the first connecting body and the second connecting body are connected to each other, and in a case that the connecting device rotates by various angles, the first connecting body and the second connecting body cooperatively bend without appearing a crease or a fold.

6. The electronic device according to claim 5, wherein the first tightness is smaller than the second tightness, and the first connecting body is easier to be stretched than the second connecting body.

7. The electronic device according to claim 6, wherein the second connecting body is made of a non-stretchable material.

8. The electronic device according to claim 5, wherein the first enveloping mechanism is fixed respectively to the first body and the second body.

9. The electronic device according to claim 5, wherein the connecting device comprises:
a first mounting plate;
a second mounting plate;
a hinge assembly rotatably connecting the first mounting plate and the second mounting plate; and
a filler filling a gap inside the hinge assembly.

10. The electronic device according to claim 9, wherein the hinge assembly comprises at least two multispindle hinges, and the filler fills a gap between the at least two multispindle hinges.

11. The electronic device according to claim 10, wherein the filler is an arc-shaped structure, and an arc-shaped side wall of the arc-shaped structure is provided with at least one through hole passing though the arc-shaped side wall along an extending direction of the arc-shaped side wall.

12. The electronic device according to claim 11, wherein the multispindle hinge comprises a plurality of spindles parallel to each other, adjacent spindles are connected to each other via a connector, and a spindle located at the edge of the multispindle hinges is provided with a connecting rod, wherein the connecting rods at a first side of the multispindle hinges are fixedly connected to the first mounting plate, and the connecting rods at a second side of the multispindle hinges are fixedly connected to the second mounting plate, and the number of the spindles in the multispindle hinge is the same as the number of the through holes in the filler.

13. The electronic device according to claim 12, further comprising a second enveloping mechanism, wherein the first enveloping mechanism envelops at least partial areas of the hinge assembly and the filler, and the second enveloping mechanism is located between adjacent fillers and enveloping the connector.

14. A connecting device, configured to connect a first body of an electronic device and a second body of the electronic device, the connecting device comprising:
- a first mounting plate;
- a second mounting plate;
- a hinge assembly rotatably connecting the first mounting plate and the second mounting plate;
- a filler filling a gap inside the hinge assembly; and
- a first enveloping mechanism enveloping at least partial areas of the hinge assembly and the filler, the first enveloping mechanism comprising at least one bendable and stretchable device, each bendable and stretchable device comprises a first connecting body with a first tightness and a second connecting body with a second tightness, the first connecting body and the second connecting body are connected to each other, and in a case that the connecting device rotates by various angles, the first connecting body and the second connecting body cooperatively bend without appearing a crease or a fold.

15. The connecting device according to claim 14, wherein the hinge assembly comprises at least two multispindle hinges, and the filler fills a gap between the at least two multispindle hinges.

16. The connecting device according to claim 15, wherein the filler is an arc-shaped structure, and an arc-shaped side wall of the arc-shaped structure is provided with at least one through hole passing through the arc-shaped side wall along an extending direction of the arc-shaped side wall.

17. The connecting device according to claim 16, wherein the multispindle hinge comprises a plurality of spindles parallel to each other, adjacent spindles are connected to each other via a connector, and a spindle located at the edge of the multispindle hinges is provided with a connecting rod, wherein connecting rods at a first side of the multispindle hinges are fixedly connected to the first mounting plate, and connecting rods at a second side of the multispindle hinges are fixedly connected to the second mounting plate, and the number of the spindles in the multispindle hinges is the same as the number of the through holes in the filler.

18. The connecting device according to claim 17, further comprising a second enveloping mechanism located between adjacent fillers and enveloping the connector.

* * * * *